United States Patent [19]

Davis et al.

[11] 4,335,080
[45] Jun. 15, 1982

[54] APPARATUS FOR PRODUCING SELECTIVE PARTICLE SIZED OXIDE

[75] Inventors: Robert D. Davis, Costa Mesa; Roy L. Blizzard, Mission Viejo, both of Calif.

[73] Assignee: Thermo Electron Corporation, Waltham, Mass.

[21] Appl. No.: 104,387

[22] Filed: Jan. 7, 1980

Related U.S. Application Data

[63] Continuation-in-part of Ser. No. 820,536, Aug. 1, 1977, abandoned.

[51] Int. Cl.³ ............................................. B01D 5/00
[52] U.S. Cl. ................................................... 422/244
[58] Field of Search ............. 423/492; 23/293, 293 A, 23/294, 313 R, 313 FB; 422/243, 244, 291

[56] References Cited

U.S. PATENT DOCUMENTS

| | | | |
|---|---|---|---|
| 2,862,792 | 12/1958 | Rehm | 422/199 |
| 3,533,756 | 10/1970 | Houseman | 23/294 R |
| 3,743,708 | 7/1973 | Chase et al. | 423/623 |
| 3,764,272 | 10/1973 | Sterling | 422/244 |

FOREIGN PATENT DOCUMENTS

| | | |
|---|---|---|
| 1062579 | 3/1967 | United Kingdom . |
| 1296891 | 11/1972 | United Kingdom . |

*Primary Examiner*—Hiram Bernstein
*Attorney, Agent, or Firm*—Kenway & Jenney

[57] ABSTRACT

A plasma method and apparatus produce oxide particles having average diameters determined by adjustment of process conditions. Feed material is fed into a dual chamber reaction zone in which a plasma environment is established to cause the feed material to be vaporized. Subsequently, effluent containing the vaporized feed from the reaction zone is passed into a quenching zone where it is subjected to a quenching medium, the volume, velocity and direction of which are adjustable to determine output particle size characteristics. Feed material may be an oxide per se or one which forms an oxide in situ through reduction and/or oxidation.

8 Claims, 10 Drawing Figures

4,335,080

APPARATUS FOR PRODUCING SELECTIVE PARTICLE SIZED OXIDE

BACKGROUND OF THE INVENTION

This application is a continuation-in-part of applicants' application Ser. No. 820,536 filed Aug. 1, 1977, now abandoned.

The present invention relates to the manufacture of particles of controlled size from feed material which is either an oxide or in situ produced oxide. Oxide particles of a controlled range of sizes are needed for various applications such as pigments, flame retardants, and the like. Their production by prior art modes has been either economically infeasible or less than satisfactory from a quality standpoint.

The physical properties of oxide materials of the inorganic type in a finely divided form vary considerably with their average particle size and range of particle sizes in a given sample. Certain useful properties associated with specific particle sizes of oxide materials and particle size distribution have been simply unavailable because neither the average size nor the size distribution required are attainable using known techniques. Accordingly, alternative methods and apparatus for the inexpensive production of finely divided inorganic oxide materials of controlled size are needed.

In one prior art arrangement, a feed material such as a metallic salt is introduced into a plasma reactor to vaporize the feed which is subsequently quenched to form an oxide of some average particle size. However, quite often neither the average size, volume of production, nor the range of sizes have amounted to an output product of commercial utility and value.

The process and apparatus of the present invention involve the use of plasma reactions but they differ materially from those of the prior art in specific process steps as well as the particular apparatus utilized. Feed material of an oxide or a substance capable of producing an in situ oxide is introduced into a plasma environment in a reaction zone which may include chambers for imposing and maintaining specific process conditions. The feed material is vaporized by the heat of the plasma and the resultant effluent from the reaction zone is quenched selectively and controllably to induce the formation of a particular end product of desired particle size characteristics.

A predetermined result of commercial quality and quantity is obtainable by selective control of the process variables of pressure, temperature, quench rate and quench disposition with respect to the vaporized effluent emanating from the plasma reactor. The invention is applicable to oxide compounds such as antimony oxide, titanium dioxide, silicon dioxide, zirconium oxide, iron oxide, aluminum oxide, zinc oxide, tin oxide, tungsten oxide, molybdenum oxide, copper oxide, nickel oxide, and alloys thereof.

While the specific form of the invention described relates to oxide compounds as set forth above, other oxide compounds of particular particle size may also be manufactured and produced in accordance with the invention, using apparatus disclosed herein, so long as necessary intrinsic parameters dictated by the chemical and physical nature of the feed material are considered. Also halides of various metals may be processed in order to produce an in situ oxide which may be converted to particles of controlled size in the micron or submicron range.

Thus, the invention relates to the production of commercial quantities of finely divided particulate materials of controlled particle size, including submicron sizes. Usually, the feed materials will be of an average particle size which is large relative to the output which is obtained.

OBJECTS AND SUMMARY OF THE INVENTION

It is a primary object of the present invention to produce finely divided oxide compounds of controlled average particle size and controlled particle size distribution.

It is a further object of the present invention to utilize efficiently plasma reactions for the commercial production of finely divided solid materials.

It is another object of the invention to employ a uniquely configured plasma reaction zone and specific quenching arrangements to obtain oxide particles of selectively controlled size.

It is still a more specific object of the invention to produce by plasma reaction and quenching techniques antimony oxide particles of submicron size.

In general terms, the practice of the present invention involves the establishment of a high-temperature plasma gas environment in a reaction zone, introducing a relatively coarse particulate feed material to react with the plasma gas or its tail flame in the reaction zone to produce an effluent containing vaporized feed material, plasma gas and carrier gas if such is used to introduce the feed material. The reaction zone is separate from the plasma generator and may include a first chamber of decreasing cross-section and a second chamber of uniform cross-section larger than that of the outlet from the first reaction chamber. A reactant gas may be introduced before the total effluent passes from the reaction zone into a quenching zone where quenching gas is directed in a controlled manner toward the effluent for producing particles having a predetermined average particle size and a predetermined particle size distribution. In a typical situation, the average particle size of the feed is larger than that obtained in the end product which will have not only a smaller average particle size than the feed but also limited particle size distribution.

By selectively maintaining a differential pressure between the reaction zone and the quenching zone; by providing a quench medium in proximity to the effluent entering the quenching zone; by controlling the discharge of the quench medium in relation to the discharge of the effluent; and by closely controlling the ratio of quench volume to the volume of effluent, the resultant average particle size and particle size distribution of the output product can be selectively maintained and adjusted. As the quench volume is increased with respect to the effluent volume, the average output particle size is reduced. As the quench discharge means is brought closer to the effluent discharge means, the effective velocity of the quench at the point of contact with the effluent is increased and quenching time is decreased which also tends to reduce the average particle size.

The range of particle size distribution is also determined by control of the quenching medium discharge. For example, a narrow range of particle size distribution is accomplished by, insofar as possible, quenching all the effluent from the reaction zone simultaneously;

the range of particle sizes increasing or decreasing, respectively, with increase or decrease in the displacement of the quench discharge from the effluent discharge.

As a specific example, having established the product through-put rate and remaining system variables, if the desired output is a product having an average particle size in the submicron range, and having a particle size distribution as narrow as possible (i.e. approaching uniform particle size), then the quenching medium will be discharged closely adjacent the effluent from the reaction zone to increase its effective velocity and assure intimate turbulent mixing of the effluent and the quenching medium; also, the volume of the quenching medium will be sufficient to quench all of the effluent in the shortest possible time.

A preferred system for practicing the invention includes a plasma generator for establishing a plasma environment and a communicating feed inlet. Connected to the plasm generator is a first reaction chamber having a decreasing cross-section. That is, the inlet or plasma generator end of the first reaction chamber is of a greater cross-sectional area than its outlet end. The outlet end is connected to a second reaction chamber of uniform cross-sectional area greater than the outlet end. The second reaction chamber has radially spaced outlets which communicate with an enclosing quenching chamber.

One or more annular quenching members within the quenching zone surround the second reaction chamber. Quenching gas from the annular members is directed to the effluent emerging through the outlets of the second reaction chamber along a path either normal to the path of the emerging effluent, in direct counterflow, or in both those directions. The oxide particles of selected size formed by the quenching operation are accumulated in a collection chamber.

Suitable equipment for the practice of the invention and several examples are described in the following specification which is to be read with reference to the accompanying drawing in which:

DESCRIPTION OF A PREFERRED EMBODIMENT

Figure 1:
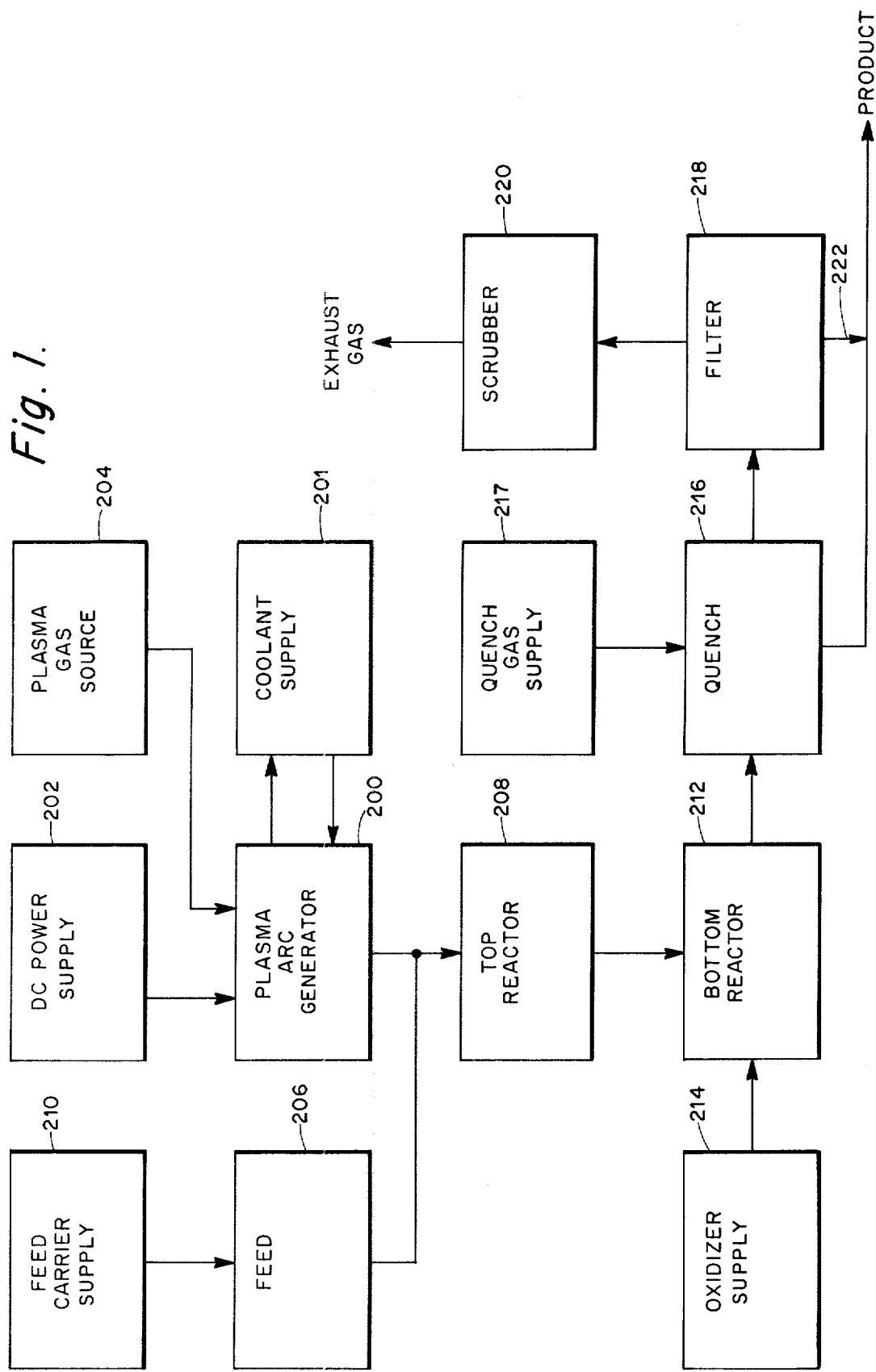
FIG. 1 is a block diagram of a preferred form of the process and apparatus of the invention.

FIG. 1 is a block diagram showing a preferred embodiment of the overall process of the invention.

A plasma arc generator 200 with an appropriate cooling means 201 is powered by a DC power source 202 and fed a nitrogen stabilizer gas from a source 204. The stabilizer gas is heated by the plasma arc in the plasma arc generator 200. The resulting tail flame from the plasma arc generator is directed into a top reeactor 208 which includes an inlet and a constricted outlet. A relatively coarse oxide feed material is supplied to the inlet from a source 206 and, if in particulate form, may be conveyed by a fluid carrier from a carrier source 210.

Essentially complete vaporization of the feed occurs in the top reactor 208 and the effluent passes through the constricted outlet to a bottom reactor 212. Any feed material not vaporized in the top reactor 208 is vaporized in the bottom reactor 212. A oxidizer 214 provides an oxidizing medium to the bottom reactor 212 if needed to maintain stoichiometry. Effluent from the bottom reactor 212 is fed to the quench zone 216 which is supplied with a quench gas from the quench source 217. The vaporized feed in the effluent is thus condensed and is first collected directly from the quench zone 216. Remaining effluent is passed to a filter 218 from which additional product is collected. The exhaust gas from the filter 218 then passes through a scrubber 220 and is discharged.

Figure 2:
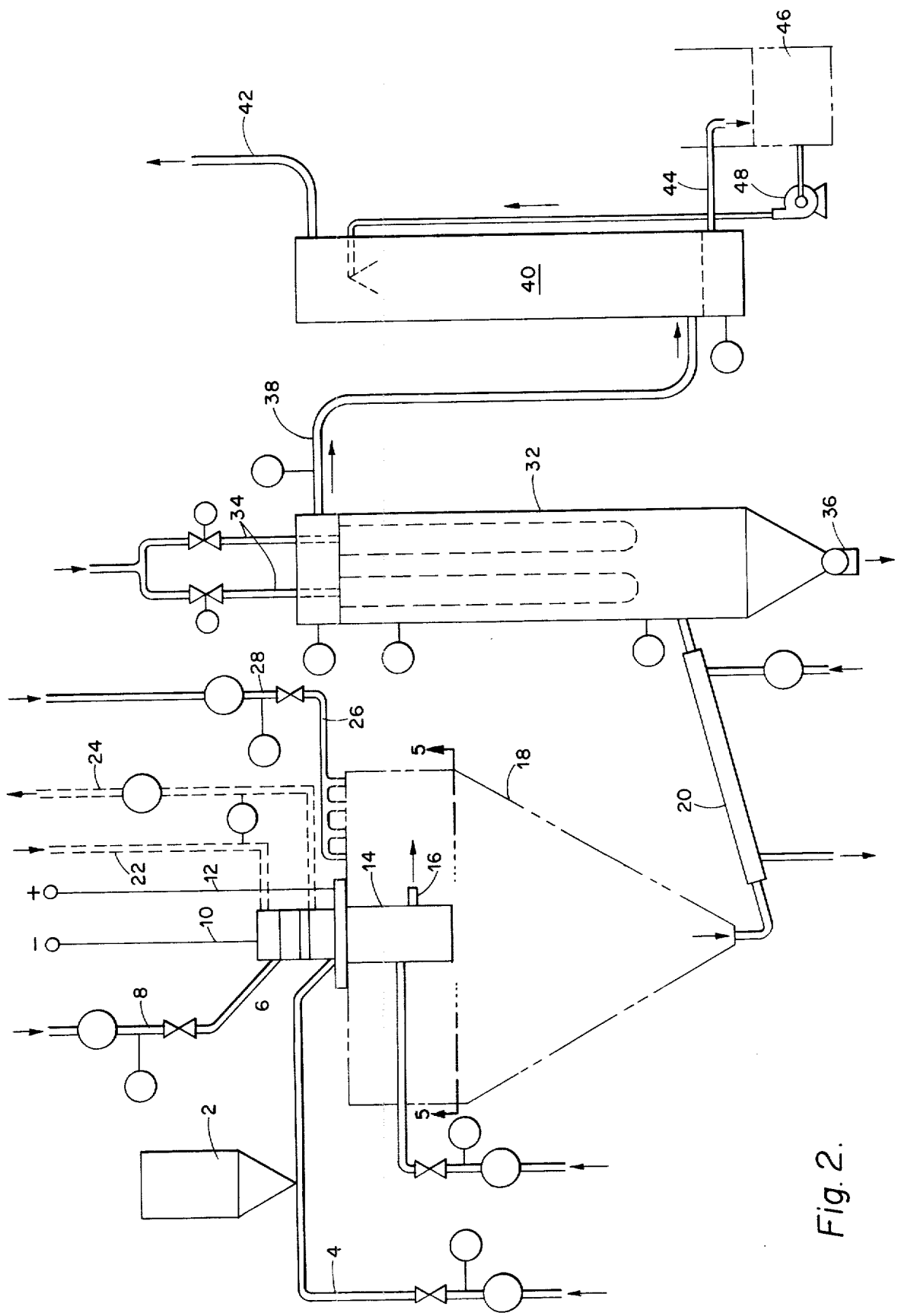
FIG. 2 is a sectional partial view of the plasma generator and reaction and quenching zone portions of the apparatus of the invention.

In FIG. 2, there is shown a feeder 2 for supplying feed material which, in this embodiment, is a particulate material. The feeder 2 operates in conjunction with a carrier gas line 4 through which feed gas, in this instance, air, is supplied under pressure. The feed gas carries the particulate material, here, for example, antimony oxide of random particle size averaging 5 microns, into the tail flame generated by a conventional plasma arc generator 6. The plasma generator 6 includes a stabilizer inlet 8, a cathode 10, and an anode 12. The plasma generator is cooled conventionally by a coil through which water flows from an inlet 22 to an outlet 24.

Disposed beneath the generator 6 is reaction zone 14 having at least one exit port 16 communicating with a surrounding quenching chamber 18. Positioned in the top of the quenching chamber 18 is a manifold 26 connected from quench rings (not shown) to a quench gas supply means 28.

A conduit 20 is connected to the bottom of the quenching chamber 18 to carry off reaction products and gases. The conduit 20 is water cooled by conventional means and leads to a bag house or filter assembly 32. In the filter assembly 32, purge gas, such as air, is introduced via inlets 34 and stripped out solid product is recovered through an outlet 36. From the bag house 32, a conduit 38 carries the gases into a scrubber 40 from which clean gas is recovered via a conduit 42. A second outlet 44 leads to a scrubbing solution vat 46 for return of the scrubbing solution. The scrubbing solution is returned to the scrubber 40 by means of a pump and conduit 48. What has been described is one overall system useful in the practice of the invention.

Figure 3:
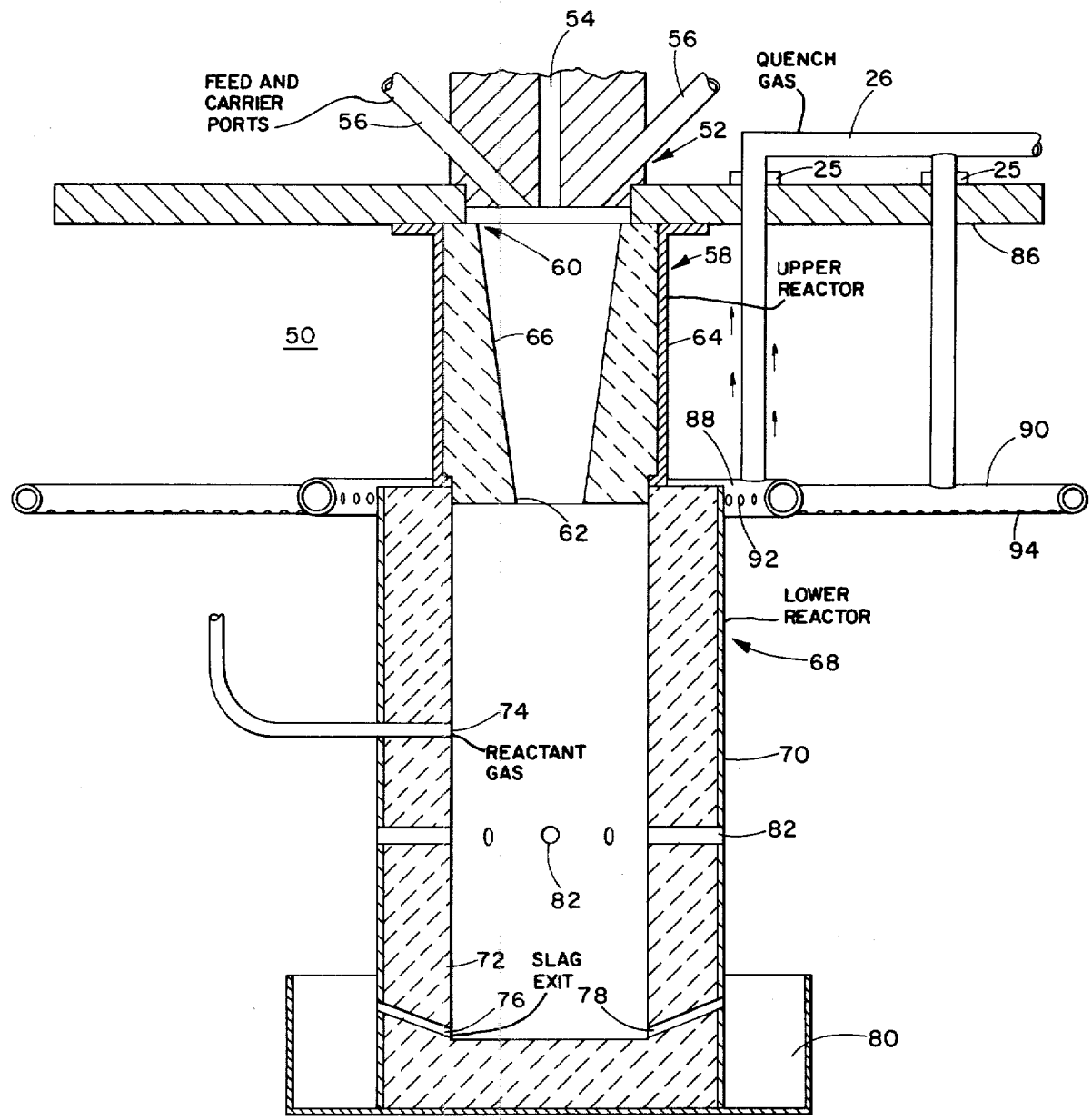
FIG. 3 is a schematic sectional view of key components of the apparatus utilized in practicing the process depicted in FIG. 1.

FIG. 3 is a fragmentary view of key elements of a preferred embodiment of the invention. The lower portion of a conventional plasma reactor head 52 is shown as having a central plasma arc flow outlet passageway 54 intersected by feed and carrier entrance ports 56.

The feed, carrier and plasma tail flame discharge into a communicating upper reactor 58 which has a generally truncated conical interior diminishing from an inlet 60 to an outlet 62.

The upper reactor 58 is constructed of an outer stainless steel housing 64 and a refractory liner 66 made, for example, of alumina. The upper reactor 58 is disposed above and in communication with a lower reactor 68. The lower reactor 68 is made of the same or similar materials as the upper reactor 58 including, for example, a stainless steel housing 70 and an interior refractory liner 72. The lower reactor 68 has an entrance port 74 connected to a supply of gas, such as oxygen, which may be introduced into the chamber of the lower reactor 68.

Adjacent the bottom of the lower reactor 68 a plurality of slag exits are formed in the reactor wall as at 76 and 78. The exits lead upwardly to a slag collector 80 which surrounds the bottom of the reactor 68 and serves as a depository for slag and other wastes produced in the reaction chambers.

Equally spaced radial exit ports 82 are formed through the wall of the lower reactor 68 and lead to a quench zone 84. The quench zone 84 is defined by a generally conical shell which may be of stainless steel substantially enclosing the upper and lower reactors. A broad flange 86 forms the top wall of the quench chamber and openings are formed in that wall to accommodate the manifold 26 which is connected to concentric quench rings 88 and 90.

Quench gas, such as air, is fed through the manifold 26 to the quench rings 88 and 90. Spaced orifices 92 are formed in the quench ring 88 an these may, for example, be oriented to direct quench gas radially inwardly in the general direction of the lower reactor exit ports 82 from which effluent from the reaction chambers emerges. The quench ring 90 is shown here as having spaced orifices 94 oriented to direct quench gas in a direction generally normal to effluent emerging from exit ports 82.

The proximity and angle of direction of the quench gas to the outlets 82 as well as the size, number, and spacing of the quench rings will selectively determine the average size of the particles and the particle size distribution of the material recovered. The manifold 26 is slidably mounted in the top wall 86 so that the quench rings and manifold assembly can be selectively raised and lowered with respect to the exit ports 82. Adjustable clamping seals 25, which seals may be operated manually, surround the manifold members at their points of passage through the top wall 86 and the mounting is such that an individual quench ring or combinations of rings may be raised and lowered. Additional quench rings may be employed if desired. Generally, if the quench rings are positioned relatively close to the exit ports 82, the size of the particles formed during the quenching process will be reduced. Conversely, if the quench ring assembly is positioned relatively far from the exit port 82, the size of the particles produced during quenching will be longer.

As noted above, quench gas orifices 94 are disposed about the lower surface of the ring 90 so that quench gas will be directed essentially normal to the path of effluent emerging from the exit ports 82. The quench openings 92 are disposed about the inner surface of the quench ring 88 so that the quench gas will be directed in counterflow to effluent emerging from the exit ports 82. The quenching effect of quench gas from the quench ring 88 is maximized when the quench ring is lowered to a point where the orifice 92 confront the exit ports 82. If it is contemplated that the inner quench ring 88 normally will be in a position somewhat above the exit ports 82, the openings 92 could be disposed in the lower surface of the quench ring 88 like those in the quench ring 90.

The size and number of spaced lower reactor exit ports 82, in conjunction with the size of the outlet 62 of the upper reactor 58 relative to the entry to the lower reactor 68, set up differential pressures and temperatures not only between the upper reactor 58 and the lower reactor 68 but, more importantly, between the reaction zone which includes both reactor chambers and the quenching zone 84. Feed material is substantially completely vaporized in the total reaction zone because the pressure and temperature differentials between the two reactors cause a turbulent and thorough mixing of the plasma gases and the feed material in the upper reactor 58, maximizing the transfer of heat from the plasma gases to the feed material. Substantially all the feed material is rapidly mixed and vaporized in the upper reactor. The lower reactor is configured and sized to provide a residence time for the mixture of plasma gases and feed material to permit essentially complete vaporization of any feed material not vaporized in upper reactor 58 as well as a locus for the introduction of reactant gas, if needed.

The exit ports 82 are so located that any tendency for a few particles to shoot through the entire reaction zone without vaporization is inhibited and, in fact, is minimized when the ports 82 are axially normal to the opening 62. The exit ports also contribute in large measure to the establishment of temperature and pressure differentials between the reaction zone and the quenching zone 84. Also, of course, the pattern of effluent discharge into the quenching chamber is determined in large degree by the disposition of the exit ports. The temperature and pressure in the two chambers which constitute the reaction zone are maintained at values preventing condensation and undesired particle formation in those chambers. The conical wall configuration of the quenching chamber 84 (shown in FIG. 2) aids in effective quenching causing the vaporized feed from the lower reactor 68 to condense out in finely divided particulate form. Efficiency recovery of the output product is accomplished in accordance with known techniques utilizing cyclone, bag house or like recovery methods.

Where the feed material is a silicate or other substance which is to be reduced and subsequently oxidized, the in situ reactants are carried through the reaction zone 68 with a residence time effective to allow adequate mixing and reaction prior to exiting through the ports 82.

Figure 4:
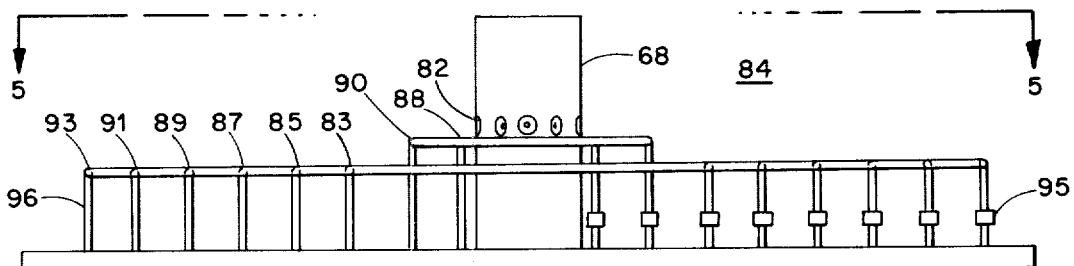
FIG. 4 is a fragmentary view of the annular quenching members of the quenching zone.
Figure 5:
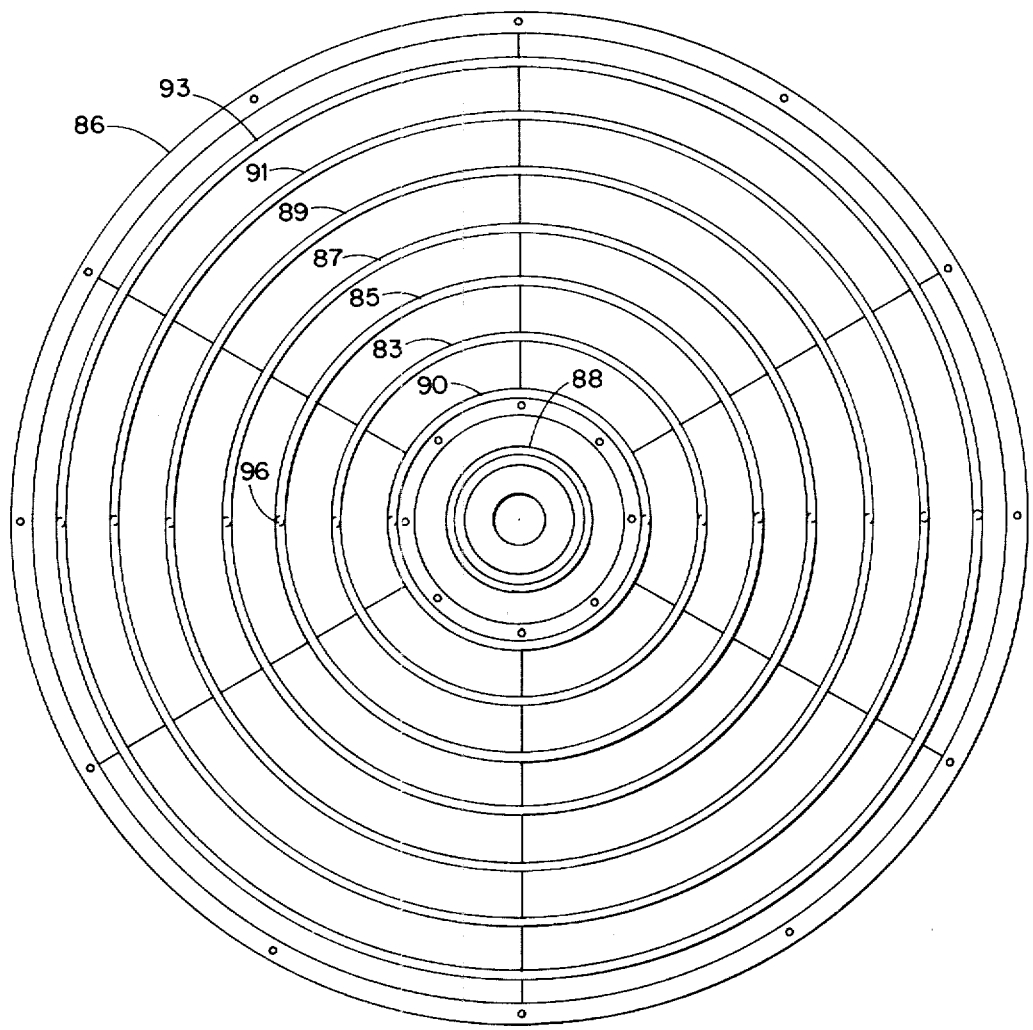
FIG. 5 is a cross-sectional view taken along the line 5—5 of FIG. 4.

FIGS. 4 and 5 illustrate typical disposition of the quench rings 88 and 90, relative to the quenching chamber 84. A plurality of bores or apertures are formed in the top 86 and a manifold feed, not shown, may be connected to each of the individual header pipes 96. The header pipes are connected to spaced quench rings, for example, 88, 90, 83, 85, 87, 89, 91 and 93. A valve 95 may be connected to each header 96 so that quench gas or fluid may be selectively directed through one or more of the concentrically placed quench rings, depending on the particular particle size distribution and average particle size desired in the end product. Any one or combination of the quench rings may introduce the quenching gas and, in each instance, the quench rings are provided with spaced orifices like 92 and 94 in the quench rings 88 and 90, respectively, as illustrated in FIG. 3. As with the spaced apertures in the quench rings 88 and 90, the rings 83, 85, 87, 89, 91 and 93 are formed with apertures to provide a desired flow direction relative to that of the effluent from the lower reaction chamber 68.

As effluent emerges from the exit ports 82 it encounters one or more streams of quenching medium angularly directed from one or more concentrically placed quench rings so as to condense in finely divided form the vaporized product entrained and contained within the effluent. The closer the discharge of the quench gas to the effluent emerging from the exit ports 82, the smaller average size and distribution average of the end product collected. If the smaller quench rings relatively near the ports 82 are activated, the average particle size of product resulting from a given run will be minimized and can be in the submicron range. To maximize the average particle size and distribution, the quench rings furthest from the exit ports are activated. Examples of the relationship of the quench rings to reactor discharge and the effect on recovered product are given hereinafter but generally, the volume ratio of quench gas to effluent from ports 82 is in the range 1:1 to 10:1.

Figure 6:
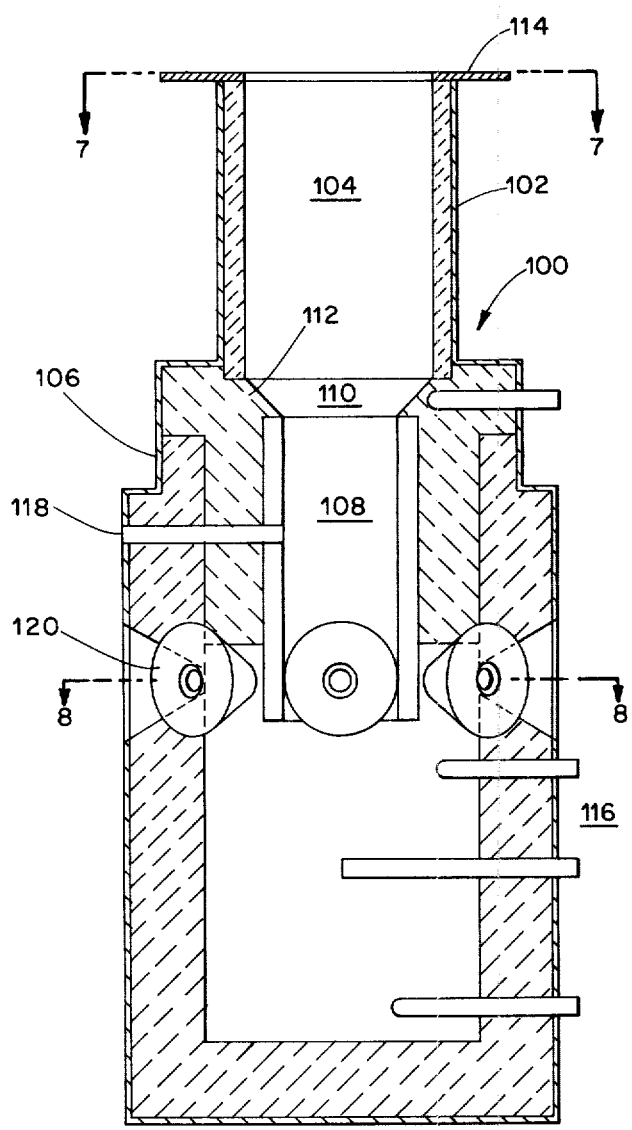
FIG. 6 is a fragmentary view in cross-section of an alternate structural embodiment of the invention.
Figure 7:
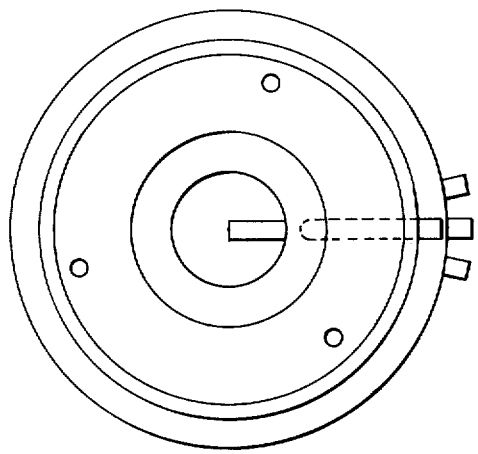
FIG. 7 is a cross-sectional view taken along line 7—7 of FIG. 6.
Figure 8:
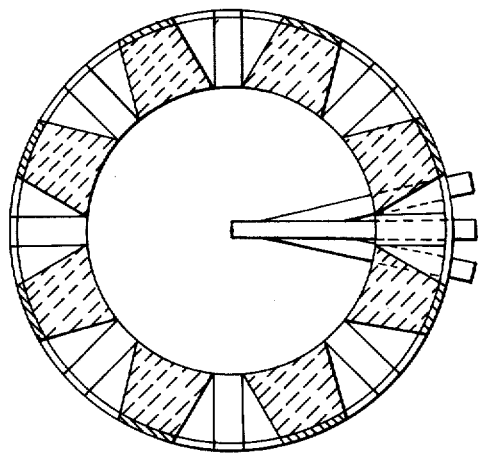
FIG. 8 is a cross-sectional view taken along line 8—8 of FIG. 6.

In FIGS. 6, 7 and 8, an alternate embodiment is illustrated. It includes an upper reactor 102 forming a reaction zone 104 of substantially uniform diameter and communicating with a lower reactor 106 forming a second reaction zone 108, the zones 104 and 108 communicating through a transition zone of decreasing diameter 110 formed by the refractory liner 112 in lower reactor member 106. Although no plasma head is shown, it would be as illustrated in FIG. 3, positioned above the first reaction zone 104 and above the upper flange 114 which forms the top boundary of the quench zone 116 surrounding the lower reactor 106. An inlet 118 to the second reaction zone permits oxygen or a reducing reagent to be introduced. The lower reactor 106 has circumferentially spaced exit ports or orifices 120 opening into the quench zone 116.

In this instance, the spaced outlet ports or apertures 120 are tapered with their large ends facing the surrounding quench zone 116. As in the embodiment of FIGS. 3, 4 and 5, concentric quench rings of various radii surround the exit ports 120.

Figure 9:
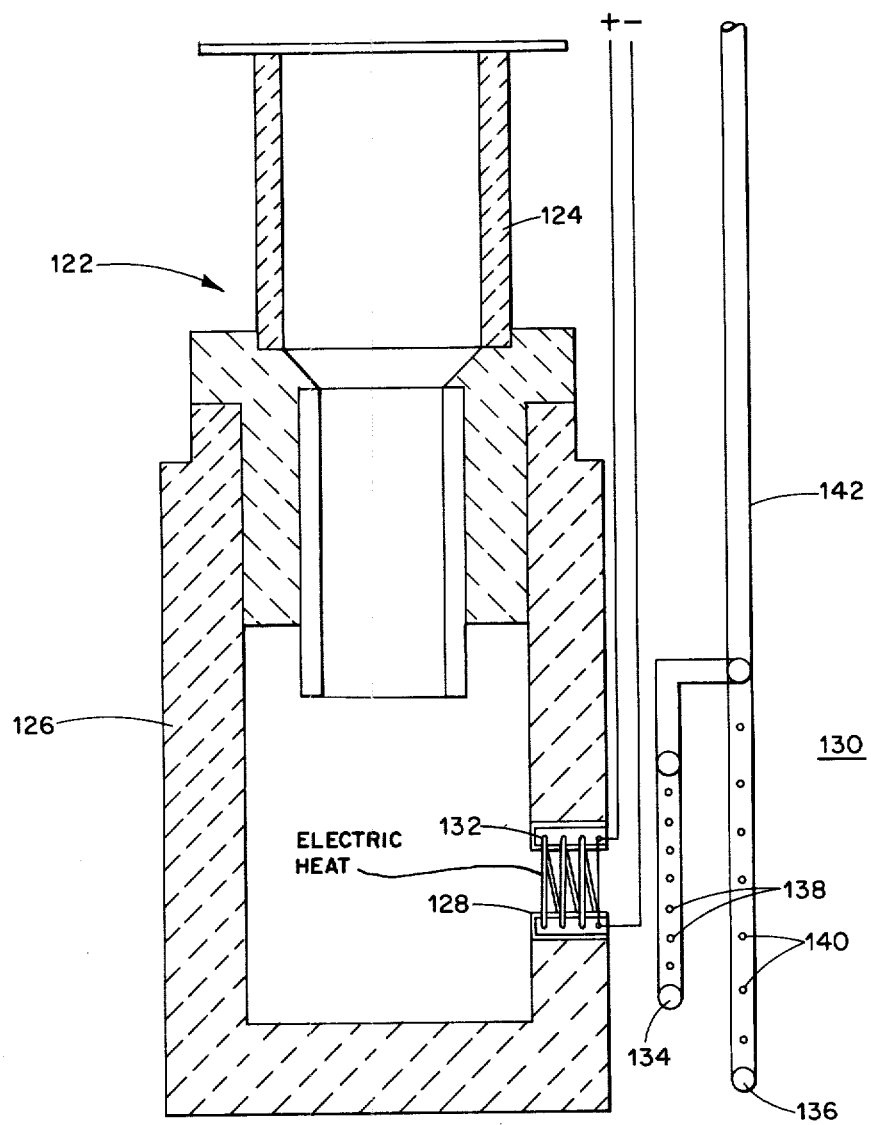
FIG. 9 is a schematic illustration of a refinement of the apparatus of the invention showing an electrically heated effluent exit port at which quenching gas is radially directed.

In FIG. 9, a second alternative quench ring arrangement is schematically illustrated. Here, again, the plasma head (not shown) is disposed above a first reactor 124 which communicates with a second reactor 126. A single exit port or orifice 128 communicates with a quench zone 130. The pressure and temperature differential between the second reactor 126 and the quench zone 130 is suitably maintained by the size of the singular exit orifice 128. The walls of the orifice 128 are heated by an electrically energized heating element 132 to prevent condensation or accumulation of condensed solids around or within the orifice. A pair of quench rings 134 and 136 are suitably supported within the quench zone 130, spaced from and concentric with the orifice 128. That is, the quench rings lie in planes normal to the central axis of the orifice with their axes substantially aligned with that of the orifice.

Spaced, inwardly directed apertures 130 and 140 are formed in the quench rings 134 and 136, respectively, so as to direct the quenching medium radially inwardly into the flow path of the effluent emerging from the orifice 128. The quench rings 134 and 136 are supported from and communicate with a common quench supply means. The assembly is selectively adjustable along the longitudinal axis of the orifice 128. The operation and performance of the apparatus and process are similar to that previously described in connection with other embodiments of the invention.

Figure 10:
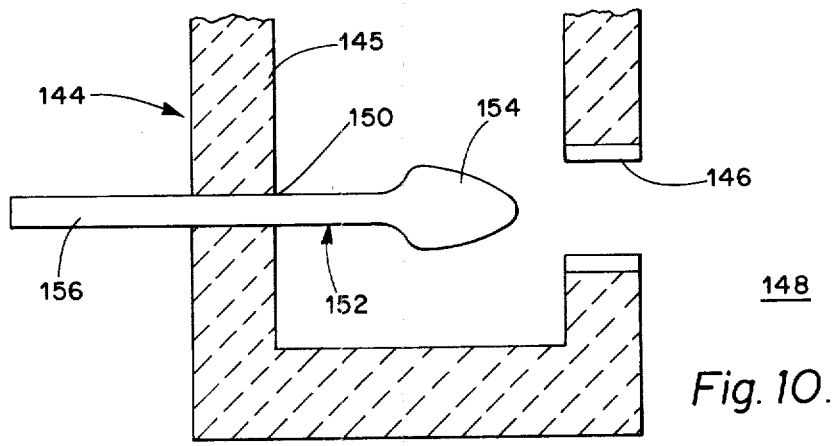
FIG. 10 is a schematic illustration of an exit port of adjustable size.

FIG. 10 schematically illustrates an optical valved orifice which permits selective adjustment of the pressure and temperature differential between the reaction chamber and quench zone. In this view, the lower portion of the reactor 144 is shown as having a single exit port 146, which may or may not be heated, communicating with a quench zone 148. A support 145 having a bore 150 is provided opposite the exit port 146. Slidably disposed in the bore 150 is a valve stem 152. The stem 152 carries an integral tapered valve and movement of the stem by means not shown adjusts the position of the head 154 relative to the exit port 146 varying the effective exit area. The valve stem 152 may be electrically heated also so as to prevent particle formation thereon. The relative pressure and temperature between the reaction zone and quenching zone 148 thus may be selectively varied to obtain particulate material of a desired size.

A series of runs was made using antimony oxide (Sb$_2$O$_3$) of a particle size in the 1 to 5 micron range as the feed material. The oxide was fed into the reactor of the type illustrated in FIG. 3. The exit ports or orifices were approximately one-half inch in diameter and were spaced circumferentially of the lower reactor member as in the embodiment depicted in FIG. 3. The results of these runs are illustrated below in Table I. In Table I, "Air Quench SCFH" designates the flow of air to the quench ring or rings in standard cubic feet per hour; the "Quench Ratio" defines a ratio where the denominator is the total gas input to the system, less quench gas, plus the feed expressed in standard cubic feet per hour and the numerator is quench gas expressed in standard cubic feet per hour; "Cal. Temp. °C." designates the calculated temperature in degrees Celsius of the upper reaction zone; "Feed Rate lb/hr" designates the rate, in pounds per hour, of feed delivery to the plasma reactor; "Oxygen to Reactor SCFH" designates the amount of oxygen supplied to the plasma reactor in standard cubic feet per hour; and "Particle Size Population Distribution Mass %—Microns" is used to designate the percentage of the total particulate recovery which is within various designated ranges, expressed in microns.

TABLE I

| Run No. | Air Quench SCFH | Ratio Quench | Cal. Temp. °C. | Feed Rate lb/hr | Oxygen to Reactor SCFH | Particle Size Population Distribution, Mass % - Microns | | | | | | |
|---|---|---|---|---|---|---|---|---|---|---|---|---|
| | | | | | | <0.1 | 0.1–0.2 | 0.2–0.5 | 0.5–1.0 | 1.0–2.0 | 2.0–5.0 | >5.0 |
| (1) | 2066 | 1.5:1 | 1577 | 134 | 153 | 44.0 | 25.6 | 17.5 | 9.1 | 3.2 | 0.5 | 0.1 |
| (2) | 2583 | 2.4:1 | 2427 | 88.9 | 153 | 64.6 | 19.3 | 12.2 | 2.9 | .8 | — | — |
| (3) | 3099 | 2.46:1 | 1677 | 131 | 102 | 80.3 | 15.6 | 3.9 | 0.2 | 0.02 | — | — |

In the first run, No. 1, two quench rings were utilized, one 12" in diameter and the other 30" in diameter. The quench rings were approximately 30¼" above the eight exit ports in the lower reactor member communicating to the quench zone. In run No. 2, the 12" quench ring was lowered to approximately 6¼" above the exit ports while the 30" quench ring remained at the original height. In run No. 3, the only quench ring utilized was the smaller quench ring was lowered to approximately 2" above the exit ports. In this instance, one of the exit ports was heated while the remaining seven exit ports remained unheated. About the one heated port, an annular quench ring was disposed in the manner illustrated in FIG. 9. From Table I, it is apparent that there is a shift toward an output of relatively small submicron particle sizes and away from larger particle sizes as the space between the quench ring and the exit ports is decreased. For example, comparing runs 1 and 2, antimony oxide having a particle size distribution with a major portion of average size less than 0.1 micron is obtained where the quench gas, in this instance, air, is discharged close to the exit ports. Also, run No. 3 empirically illustrates the fact that the closer the quench gas discharge to the exit ports, the smaller the average particle size of the processed material obtained and the narrower the particle size distribution.

In order to ascertain the effect of the amount of quench medium on the inventive apparatus and process, a number of runs were made utilizing the type of reactor configuration illustrated in FIG. 3. Data on these runs is found in Table II in which column designations are as in Table I. Eight spaced ⅛" diameter exit ports and a single diameter quench ring were utilized. The quench ring was positioned in each of the runs approximately 6¼" to 6½' above the exit ports. The feed material was antimony oxide having a typical particle size in the 1-5 micron range.

The feed material used for runs 6, 7 and 8 was of 1.3 micron Fisher-average particle size and of commercial, high tint antimony oxide. The results of these runs are tabulated below in Table III, the column designations again being identical to those of Table I.

TABLE III

| Run No. | Air Quench SCFH | Ratio Quench | Cal. Temp. °C. | Feed Rate lb/hr | Oxygen to Reactor SCFH | Particle Size Population Distribution, Mass % - Microns | | | | | | |
|---|---|---|---|---|---|---|---|---|---|---|---|---|
| | | | | | | <0.1 | 0.1–0.2 | 0.2–0.5 | 0.5–1.0 | 1.0–2.0 | 2.0–5.0 | >5.0 |
| (1) | 3513 | 3:1 | 1997 | 121 | 102 | 57.2 | 24.0 | 14.5 | 3.5 | 0.7 | 0.2 | <0.1 |
| (2) | 3513 | 3.1:1 | 1997 | 124.5 | 102 | 53.5 | 22.3 | 17.3 | 6.2 | 0.7 | <0.1 | — |
| (3) | 5166 | 4.5:1 | 2027 | 109 | 102 | 52.5 | 27.8 | 15.0 | 3.9 | 0.7 | <0.1 | — |

Table IV lists operating parameters of the runs set forth in Table III. The data is correlated with the general system description given in FIG. 1, the reference numbers in the left-hand column of Table III identifying elements of the apparatus shown in FIG. 1.

TABLE IV

| Run No. | (1) | (2) | (3) |
|---|---|---|---|
| D.C. Power (202) KW Gross | 52.8 | 53.6 | 51.8 |
| Coolant Loss (201) KW Loss | 16.15 | 16.4 | 15.2 |
| Total Power to $N_2$ Stabilizer KW Net | 36.65 | 37.2 | 36.6 |
| $N_2$ Stabilizer Supply (204) SCFH | 413 | 413 | 413 |
| Air Feed SCFH (210) | 455 | 485 | 489 |
| *$O_2$ Supply (214) SCFH | 102 | 102 | 102 |
| Total Gas to Reactor SCFH | 970 | 1000 | 1004 |
| $Sb_2$ Total (206) Feed lbs. | 60.5 | 83 | 72.5 |
| Feed Time (hr.) | 0.5 | 0.67 | 0.67 |
| *$Sb_2O_3$ Feed (206) lb./hr. | 121 | 124.5 | 109 |
| $Sb_2O_3$ Feed SCFH | 161 | 166 | 145 |
| Total Gas to Reactor Plus Feed | 1131 | 1166 | 1149 |
| *Quench Air SCFH (217) | 3513 | 3513 | 5166 |
| *Quench Ratio | 3:1:1; | 3:1; | 4:5:1 |
| Calculated Temp. °K. (208) | 2270 | 2250 | 2300 |
| *Calculated Temp. °C. (208) | 1997 | 1977 | 2027 |
| Products - Bag (218) | 49.5 | 66 | 69.5 |

*Repeat of information in Table III

TABLE II

| Run No. | Air Quench SCFH | Ratio Quench | Cal. Temp. °C. | Feed Rate lb/hr | Oxygen to Reactor SCFH | Particle Size Population Distribution, Mass % - Microns | | | | | | |
|---|---|---|---|---|---|---|---|---|---|---|---|---|
| | | | | | | <0.1 | 0.1–0.2 | 0.2–0.5 | 0.5–1.0 | 1.0–2.0 | 2.0–5.0 | >5.0 |
| (1) | 2583 | 2.49:1 | 1827 | 92 | 102 | 62.6 | 23.4 | 12.6 | 1.1 | 0.2 | 0.05 | — |
| (2) | 2583 | 2.54:1 | 2136 | 84 | 102 | 66.9 | 20.1 | 11.1 | 1.6 | 0.2 | 0.1 | .02 |

It is apparent from Table 2 that as the ratio of quench medium in this particular instance, air, is increased relative to the amount of effluent emerging from the reactor, the particle size distribution is reduced and the average particle size is smaller.

Another series of runs was made utilizing a reactor configuration of the type illustrated in FIG. 9. In this embodiment, a 6" quench ring was positioned approximately 1" from the single exit port and a 9" quench ring was positioned approximately 2" from the exit port or 1" from the 6" quench ring. The orifices in the quench rings were disposed to direct quench medium towards and into the flow path of the effluent emerging from the single exit port. That is, the direction of flow of the quench medium includes one component in counterflow to the flow of effluent from the exit port and one component normal to the direction of said effluent flow.

Various modes of practicing the present invention are possible. It should be obvious to those skilled in the art that different feed materials and modification in materials of construction and equipment may be made without departing from the scope of the invention. In some instances, metal oxide materials may be utilized as the starting materials and in other instances, a halide may be used either singularly or in conjunction with another oxidizable material wherein simultaneous oxidation is had with the production of single or mixed oxide particles.

In some instances, oxygen and/or oxidizable materials will be fed into the reaction zones, in a manner as described hereinbefore for antimony oxide, and wherein the stoichiometric chemistry is maintained so as to obtain desired oxide materials of selected particle size.

One such instance occurs with a zinc oxide feed. Using a reactor as illustrated in FIG. 3, zinc oxide is fed into the reactor while maintaining a sufficient temperature to vaporize the zinc oxide (for example, greater than 1975° C.). Effluent is directed through the reaction chamber into a quenching zone and zinc oxide of predetermined average particle size and particle size distribution is recovered.

In another instance, a feed material such as silicon dioxide, having a boiling point of 2230° C., is fed to a reactor of the configuration of FIG. 3. Reactor design varies according to operating temperatures and, here zirconia is a suitable material for use as the reactor liner. Typically, relatively high temperature reactors are smaller than relatively low temperature reactors but even with a feed such as silicon dioxide, an output of controllable average particle size and particle size distribution may be had.

Although it is possible to produce an output of larger particle size than the feed material, it is more often the goal to obtain an output of submicron size. A variety of feed materials may be used including tin oxide, titanium oxide, iron oxide, and tungsten oxide and the output particle size may be chosen by selectively varying the operating parameters and physical deposition of elements of the apparatus as disclosed above. That is, first by maintaining a differential pressure of about 2 or 3 lb./sq.in. above the atmospheric pressure in the quenching zone; second, by providing a quench medium in proximity to the effluent exiting into the quenching zone; and, third, by closely controlling the amount of quench gas volume to the volume of the effluent, the resultant particle size and the range of sizes of the recovered products can be selectively maintained. Although some interaction occurs, the parameters are independently and jointly adjustable with shifts as noted above toward larger or smaller output particle size in greater or lesser ranges.

It has been noted that an oxidizer (or a reducing gas, depending upon the type of feed material) may be introduced in the second reaction chamber. Insofar as feeds such as antimony oxide or zinc oxide are concerned, the oxidizer is useful in small amounts not so much for control of particle size as to prevent the nitrogen of the feed gas from joining with the oxygen from the vaporized feed. In such conditions, particularly with antimony oxide, a discolored output product may result.

The system has been described in connection with a gas quenching medium. However, a liquid quench could be used to provide a colloidal suspension useful in certain industrial processes, such as fabric treating. In the apparatus of FIG. 2, for example, a water quench could be supplied through the manifold 26 so that effluent from the exit port 16 forms with the water a colloidal suspension. The suspension may be recovered directly from the bottom portion of the quench tank 18 and there would be no need for the filter 32 and other downstream apparatus.

The invention should not be limited to the details of preferred embodiments shown and described but only by the spirit and scope of the appended claims.

What is claimed is:

1. Plasma reactor apparatus for the formation of particulates from a feed material comprising:

a plasma reactor;

means forming a first plasma reaction chamber communicating with the plasma reactor;

said plasma reactor being operable to generate a plasma arc and to deliver the tail flame of said arc to said first reaction chamber to establish in said first reaction chamber a plasma environment at a temperature effective to vaporize such feed material and form an effluent;

means defining an inlet to said first reaction chamber for receiving the tail flame from said reactor;

means defining entrance ports for delivering feed material to the tail flame of said plasma reactor;

means defining an outlet from said first reaction chamber having a smaller cross-sectional area than said inlet;

means forming a second reaction chamber having an inlet in fluid communication with the outlet of said first reaction chamber;

a single effluent outlet means formed in said second reaction chamber;

a valve cooperating with said single outlet means for varying the effective size thereof to vary the amount of effluent passing therethrough;

means forming a quenching chamber in fluid communication with and enclosing said single effluent outlet means;

means in said quenching chamber forming at least one quench medium discharging passageway spaced from and surrounding said single effluent outlet means and positioned to supply and direct quenching medium to effluent emerging from said effluent outlet means for condensing from said effluent particulate material having particle size characteristics functionally related to the distance between said quench medium discharging passageway and said effluent outlet means; and means to collect such particulate material from said quenching chamber.

2. The apparatus in accordance with claim 1 further comprising means for selectively varying the position of at least one said quench medium discharging passageway with respect to said effluent outlet means.

3. The apparatus in accordance with claim 1 further comprising means forming at least one additional quench medium discharging passageway in said quenching chamber surrounding said effluent outlet means and in spaced relationship to both said effluent outlet means and the first said one quench medium discharging passageway.

4. The apparatus in accordance with claim 3 wherein both said means forming both said quench medium discharging passageways comprise spaced orifices along said passageways for directing the quenching medium into the path of said effluent.

5. The apparatus in accordance with claim 4 wherein said quenching chamber is conically shaped.

6. The apparatus in accordance with claim 1 wherein said means forming said quench medium discharging passageway is toroidal in configuration.

7. The apparatus in accordance with claim 6 wherein the toroidal axis of said means forming said quench medium discharging passageway is in substantial alignment with the central axis of said effluent outlet.

8. The apparatus in accordance with claim 1 further comprising means for heating the surfaces surrounding said single outlet.

* * * * *